United States Patent
Ang

(10) Patent No.: US 12,498,565 B2
(45) Date of Patent: Dec. 16, 2025

(54) MOIRE INTERFERENCE RESISTANT DIFFUSER FOR HEADS UP DISPLAYS

(71) Applicant: Luminit LLC, Torrance, CA (US)

(72) Inventor: Anthony Ang, Long Beach, CA (US)

(73) Assignee: LUMINIT INC., Torrance, CA (US)

(*) Notice: Subject to any disclaimer, the term of this patent is extended or adjusted under 35 U.S.C. 154(b) by 898 days.

(21) Appl. No.: 17/591,817

(22) Filed: Feb. 3, 2022

(65) Prior Publication Data
US 2023/0244080 A1    Aug. 3, 2023

(51) Int. Cl.
*G02B 5/02* (2006.01)
*G02B 3/00* (2006.01)
*G02B 27/01* (2006.01)
*G02B 27/09* (2006.01)

(52) U.S. Cl.
CPC ....... *G02B 27/0101* (2013.01); *G02B 3/0037* (2013.01); *G02B 5/0205* (2013.01); *G02B 5/0278* (2013.01); *G02B 5/0294* (2013.01); *G02B 27/0927* (2013.01); *G02B 27/0961* (2013.01); *G02B 2027/011* (2013.01)

(58) Field of Classification Search
CPC .............. G02B 27/0927; G02B 3/0037; G02B 5/0205; G02B 3/0056; G02B 5/0221; G02B 27/0961; G02B 5/02
See application file for complete search history.

(56) References Cited

U.S. PATENT DOCUMENTS

| | | |
|---|---|---|
| 10,914,875 B1 | 2/2021 | Raymond et al. |
| 2004/0066547 A1 | 4/2004 | Parker |
| 2015/0001470 A1 | 1/2015 | Ma |
| 2017/0129272 A1 | 5/2017 | Rich |
| 2020/0183169 A1 | 6/2020 | Peng |
| 2021/0033758 A1 | 2/2021 | Raymond |
| 2021/0333442 A1 | 10/2021 | Ang et al. |

FOREIGN PATENT DOCUMENTS

| | | |
|---|---|---|
| GB | 2482193 A | 1/2012 |
| JP | 2006039044 A | 2/2006 |
| JP | 2010164774 A | 7/2010 |
| WO | 2006129797 A1 | 12/2006 |

OTHER PUBLICATIONS

International Search Report and Written Opinion for PCT/US23/61354 filed Jan. 26, 2023, mailed Jun. 23, 2023, 15 pgs.
International Preliminary Report on Patentability for PCT/US2023/061354 filed Jan. 26, 2023, mailed Aug. 15, 2024, 8 pgs.

*Primary Examiner* — Ryan D Howard
(74) *Attorney, Agent, or Firm* — PATENT LAW WORKS LLP

(57) ABSTRACT

An apparatus, system, and method is described for partially or completely eliminating Moiré interference artifacts generated in a heads up display having a diffuser with a micro lens array. Each lenslet of the micro lens array is faceted with micro facets positioned at least partially randomized. Aspects of the faceting may be selected to prevent Moiré interference artifacts but permit the diffuser to be used in a heads up display.

20 Claims, 21 Drawing Sheets
(10 of 21 Drawing Sheet(s) Filed in Color)

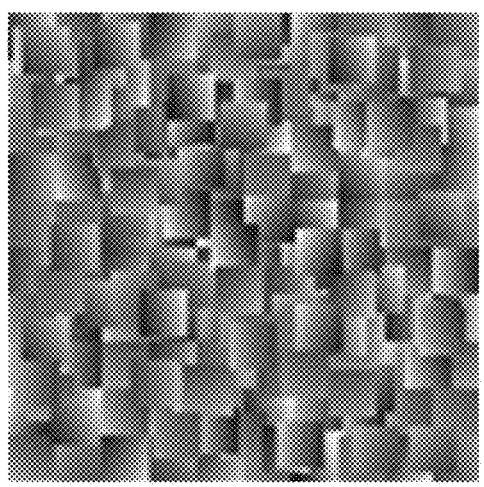
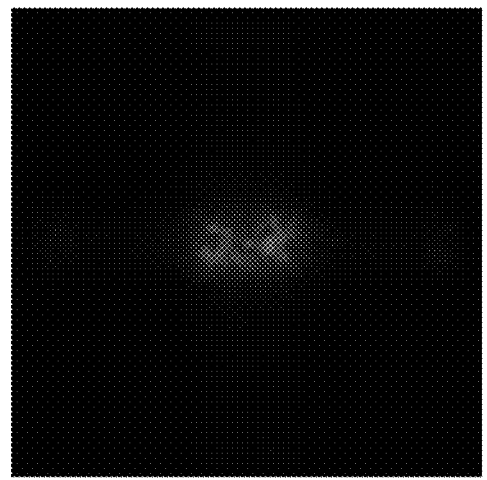
Figure 17A
Figure 17B
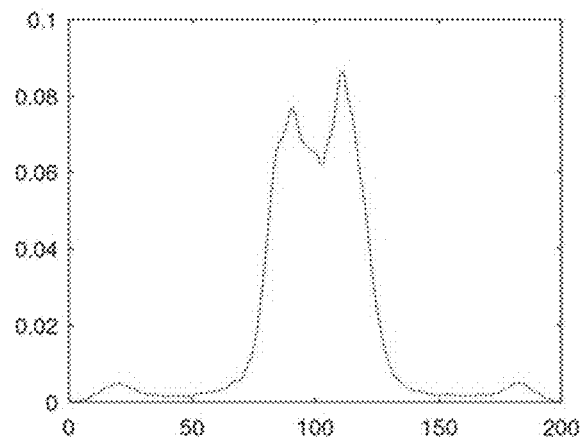
Figure 17C
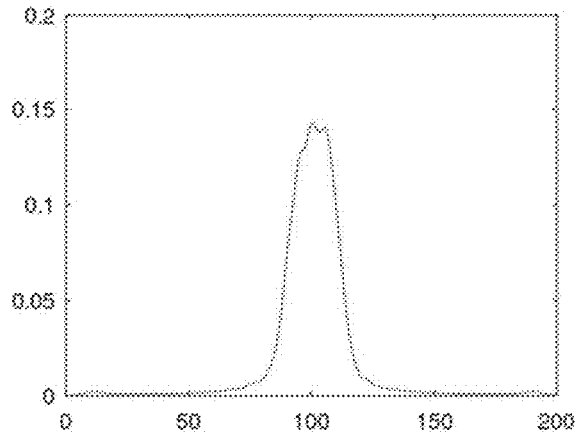
Figure 17D

MOIRE INTERFERENCE RESISTANT DIFFUSER FOR HEADS UP DISPLAYS

FIELD OF THE INVENTION

The present disclosure generally relates to optical diffusers for heads up displays. More particularly the present disclosure is related to a diffuser with a micro lens array design that reduces or eliminates Moiré interference artifacts.

BACKGROUND

Referring to FIG. 1, in some heads-up display (HUD) applications, a digital light projector (DLP) projects an array of pixels onto an optical diffuser to scatter the light into higher angles. The diffuser may be a flat top diffuser using a micro lens array (MLA). For a flat top diffuser, the illumination distribution of the higher angles is ideally a flat top distribution (as illustrated in FIGS. 2A & 2B), to provide an even amount of illumination per pixel to the viewer, within a range of eye positions (eye box). A flat top diffuser (FTD) is the type of device that will provide this type of scattering of light.

FIGS. 3A and 3B illustrate an example of a MLA. FIG. 3A illustrates a MLA and FIG. 3B has blue lines indicating the borders of the imaging pixels. The MLA is a regular micro lens array that spreads a collimated light beam into a desired pre-determined angular distribution. Each lenslet is shaped so the radius and aspheric surface shape spreads the light correctly within the clear aperture (boundary) of the lens given a specific material index of refraction or reflection. An alternative is to make multiple lenslets within a pixel pitch such that the dimension of the pixel pitch is an integer multiple of the lenslet pitch (e.g. FIG. 3B). The integer value can be different in each direction. The lenslets are arranged in an array, such that all lenslets are identical in surface shape and boundary dimensions.

However, in the real-world, there are a variety of problems with an MLA. MLAs can be fabricated using techniques such as Direct-Write-Laser (DWL) techniques capable of exposing grayscale or with the use of grayscale Photomasks. The structures formed in photoresist can be transferred in surface relief micro-structures. The manufacturing processes used to manufacture a MLA have associated with them manufacturing tolerances. That is, in a high-yield MLA fabrication process there may be a variety of tolerances in each step of the manufacturing process that creates a set of cumulative manufacturing tolerances.

In the real-world case, a MLA has optics with tolerances which have different magnifications. The pitch of the projected pixels is not perfectly matched with the pitch of the lenslet array. In addition, the projected image will have distortion. FIG. 4A illustrates a uniform MLA whereas FIGS. 4B and 4C illustrate the influence of distortion. As a result of these two factors, variations in magnification and distortion, the image will have Moiré interference pattern artifacts. In the optics industry, Moiré interference pattern artifacts are known to occur when there are 2 patterns with pitches (or frequencies) that are close but not exactly matched, which results in a lower frequency beating.

A significant level of Moiré interference pattern artifacts is highly noticeable in some types of HUD systems. Moiré interference pattern artifacts may also be more problematic for commercial, low cost applications in which it may be harder to achieve tight manufacturing tolerances on the MLA.

Embodiments of the disclosure were developed in view of the above-described problems.

SUMMARY

The present disclosure relates to systems and methods for designing, fabricating, and using a micro lens array that reduces or eliminates Moiré pattern artifacts.

An example of an optical diffuser for a Heads Up Display (HUD includes a micro lens array having an array of lenslets shaped to implement an optical diffuser function. Each individual lenslet has micro facets following a topological contour of a curved base lenslet shape for the individual lenslet with a placement of the micro facets at least partially randomized to prevent Moiré interference artifacts in response to the micro lens array being illuminated by a digital light projector.

It should be understood, however, that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure is illustrated by way of example, and not by way of limitation in the figures of the accompanying drawings in which like reference numerals are used to refer to similar elements.

FIG. 17A illustrates an example facet pattern and FIGS. 17B, 17C, and 17D illustrate the far field plot and slice plots in accordance with an implementation.

DETAILED DESCRIPTION

Figure 1:
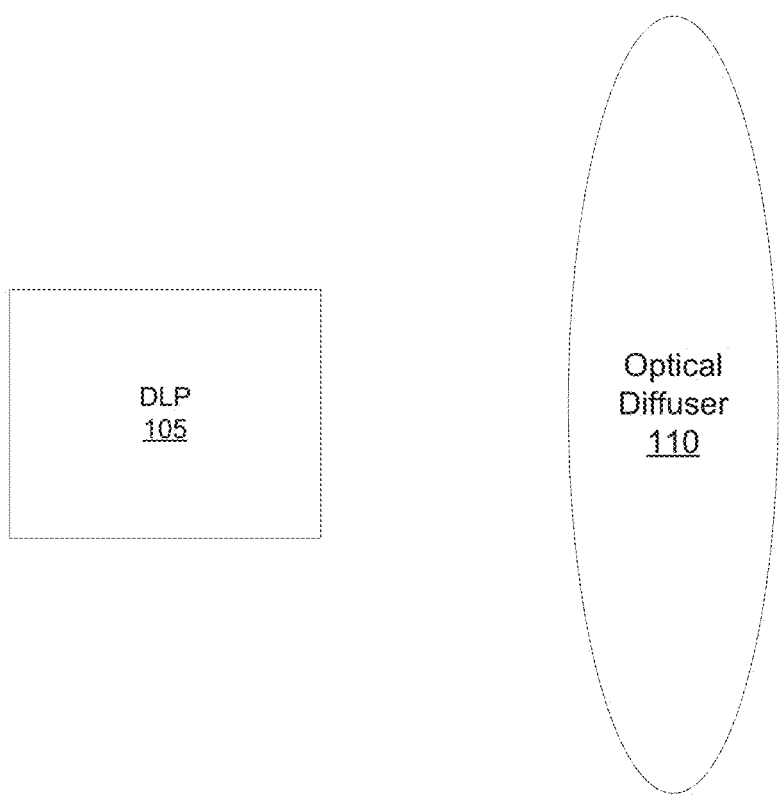
FIG. 1 is a high level diagram of a HUD having a digital light projector and a diffuser having a micro lens array with features to reduce or eliminate Moiré interference artifacts.
Figure 2A:
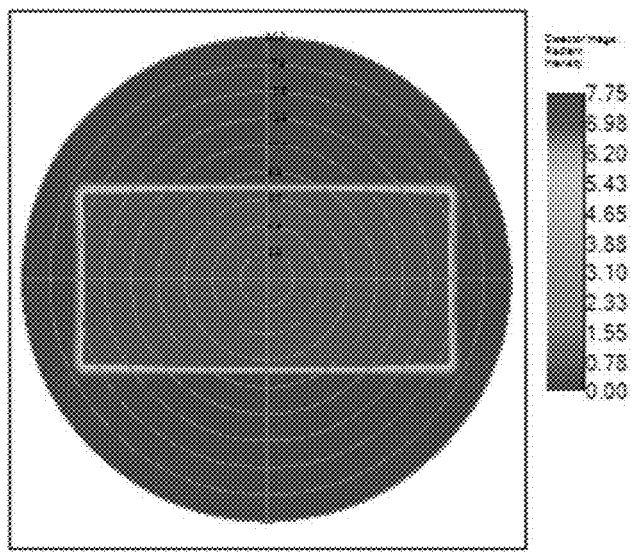
FIG. 2A is a heat map of the angular response of a flat top diffuser.
Figure 2B:
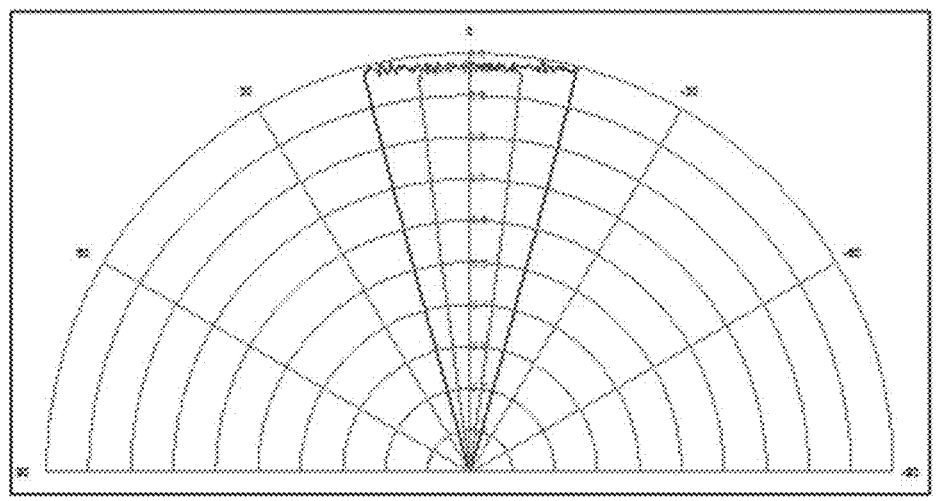
FIG. 2B is an angular plot of the response of a flat top diffuser.
Figure 3A:
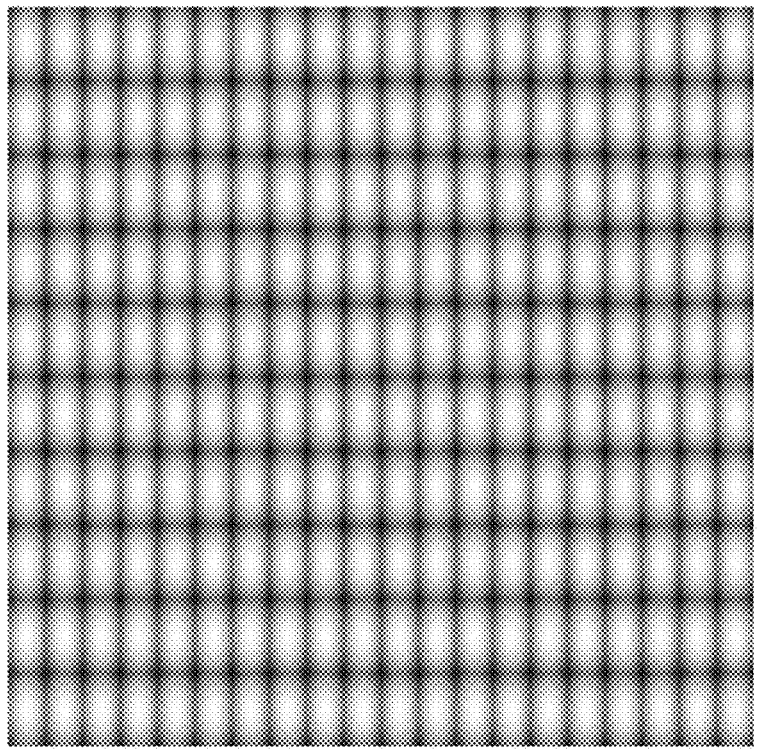
FIGS. 3A and 3B illustrate examples of a micro lens array to implement a diffuser.
Figure 3B:
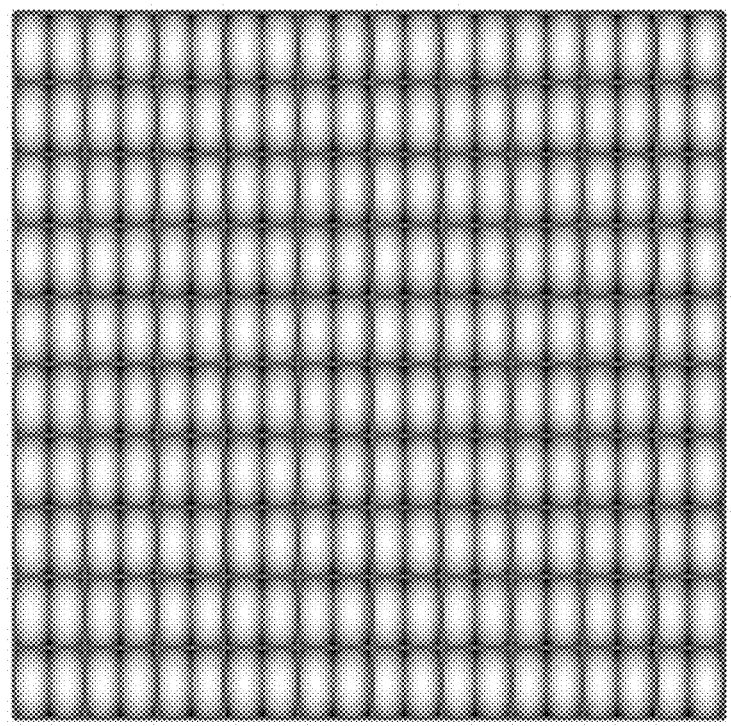
Figure 4A:
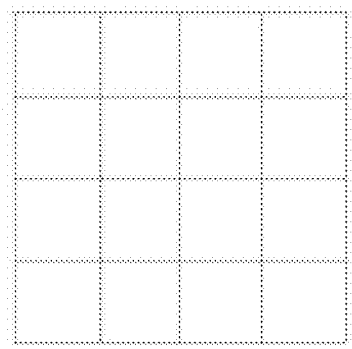
FIGS. 4A, 4B, and 4C illustrate the difference between an idealized micro lens array (FIG. 4A) and manufacturing variations (FIG. 4B and FIG. 4C).
Figure 4B:
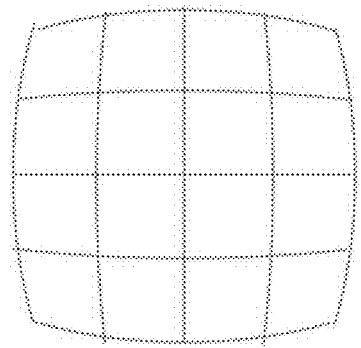
Figure 4C:
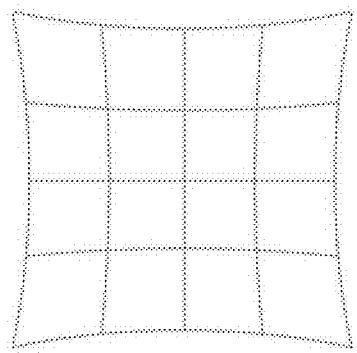
Figure 5A:
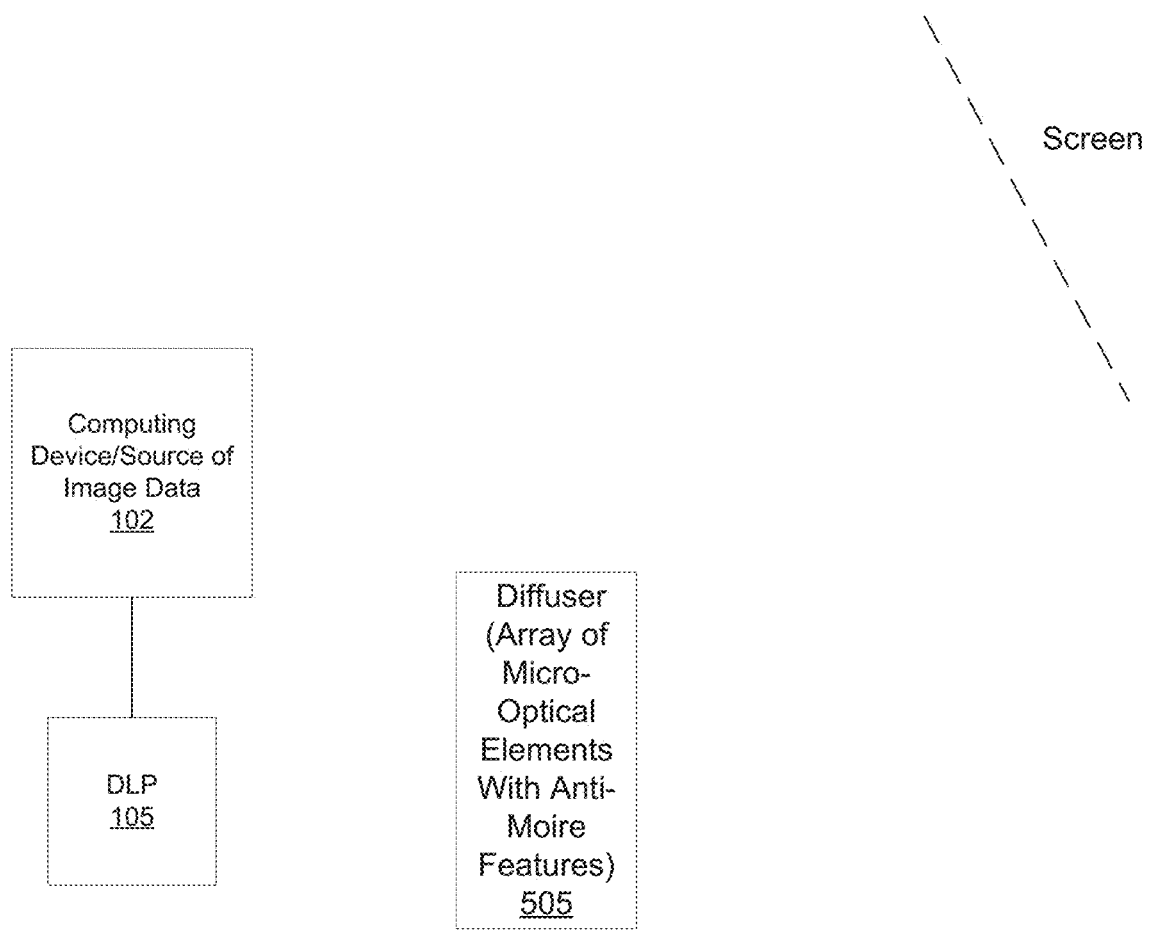
FIG. 5A is a high-level diagram of a Heads Up Display having a diffuser with ant-Moiré features in accordance with an implementation.
Figure 5B:
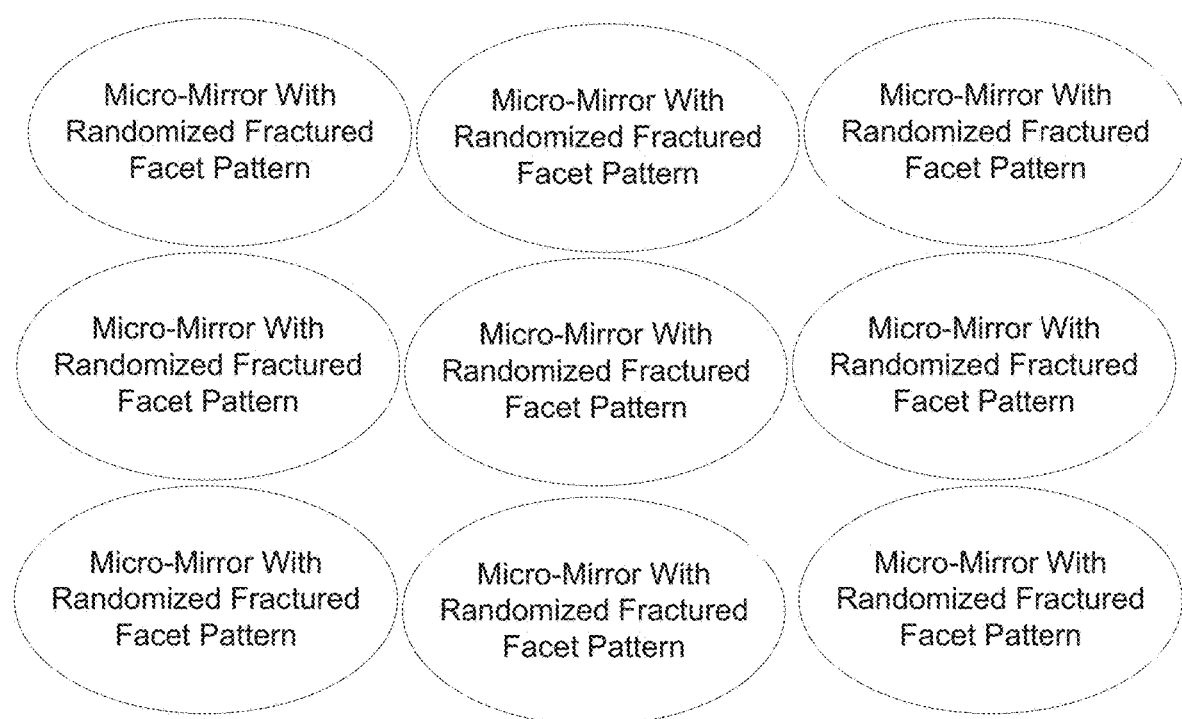
FIG. 5B illustrates a diffuser with micro-mirrors with ant-Moiré features in accordance with an implementation.
Figure 5C:
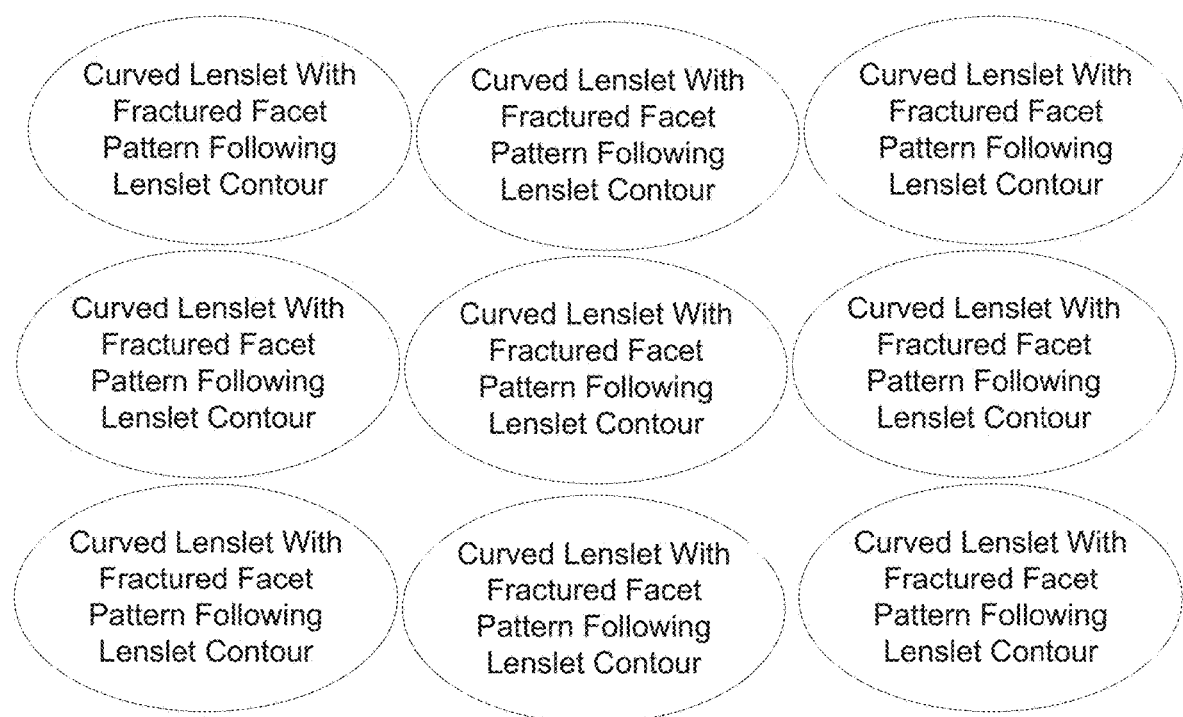
FIG. 5C illustrates micro lens array with a fractured facet with a facet pattern that reduces or eliminates Moiré artifacts in accordance with an implementation.
Figure 5D:
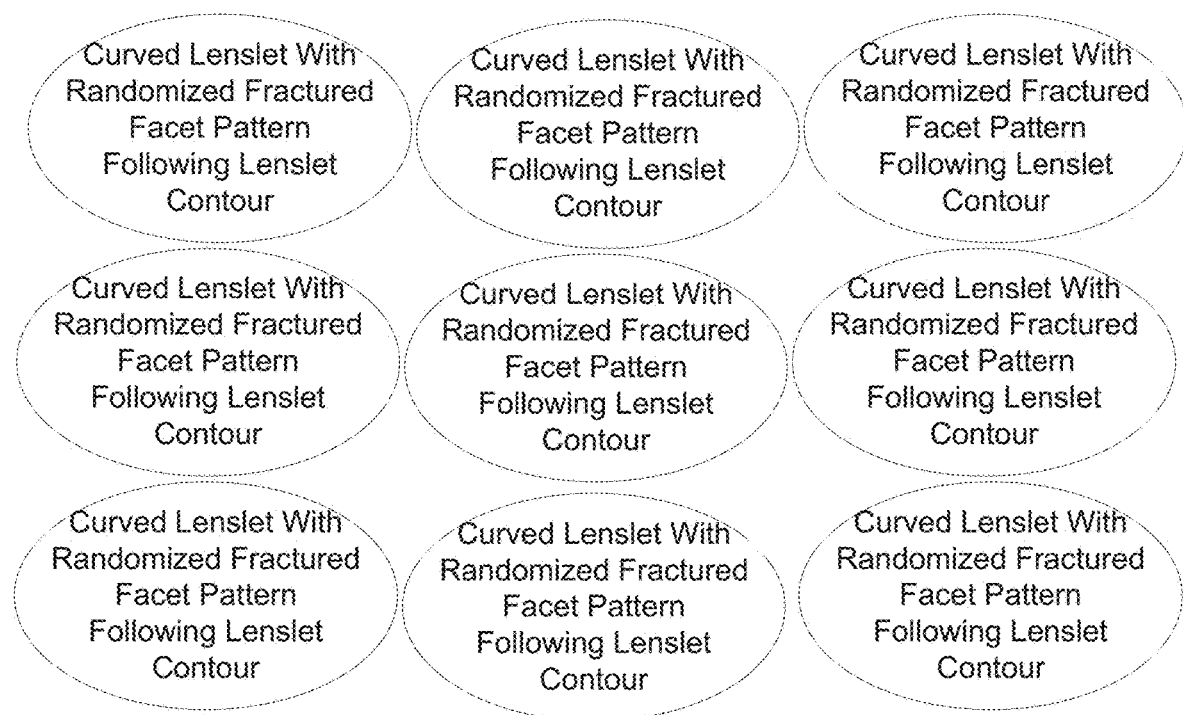
FIG. 5D is a high-level figure illustrating a micro lens array with a facet pattern that reduces or eliminates Moiré artifacts in accordance with an implementation.

The present disclosure describes systems and methods for a diffuser designed to reduce or eliminate Moiré interference pattern artifacts. As illustrated in FIG. 5A, a Heads Up Display (HUD) may include a computing device 102 to generate images displayed by a DLP 105. A diffuser 505 scatters the light to a screen. The diffuser 505 has an array of micro-optical elements with anti-Moiré features. In particular, each micro-optical element may have a fractured surface pattern that reduces or eliminates Moiré artifacts. For example, a surface of a mirror micro-optical element or a lenslet micro-optical element many be fractured into an array of facets. Additional randomization of aspects of the array of facets may be further performed as described below. That is, each micro-optical element has a facet pattern selected to reduce Moiré artifacts. As illustrated in FIG. 5B, the micro-optical element array may comprise an array of micro-mirrors which have mirror surfaces with a fractured facet pattern. However, as illustrated in FIG. 5C, the diffuser may be implemented as a micro lens array with a fractured facet pattern. As illustrated in FIG. 5D, in one implementation, the facet pattern of the MLA be fractured with a randomized fractured pattern A detailed example will now be described for a MLA implementation of a diffuser. There are a variety of conventional manufacturing processes and tools used to form the surface profile of the lenslets of a micro lens array. This sometimes includes tools to form grey scale images to closely approximate the curved surface of a lenslet. But conventionally, no attention was paid to randomizing aspects of the surface facets of the lenslets.

In the present disclosure, the individual lenslets have a Micro Facet Array in which the surface of the lenslet has many different facets positioned to reduce or eliminate Moiré interference pattern artifacts. In particular, adding an aspect of randomization to how the facets on a lenslet are positioned to cover the lenslet helps to prevent Moiré interference pattern artifacts. The surface can be fractured with a facet pattern having aspects of randomization that are beneficial to reduce or eliminate Moiré interference pattern artifacts.

An individual lenslet may have a large number (e.g., several dozen, a hundred, or several hundred) facets having an aspect of randomization. For example, an individual lenslet could have an array of Randomly Placed Facets (RPF) or Partially RPF (PRPF). Adding an aspect of randomness to the facets of lenslets breaks up patterns that create Moiré interference. The facets can be formed to follow the overall curved topology of a base optical design of lenslet to maintain the diffuser function (e.g., a Flat Top Diffuser as one example).

In one implementation, individual facets are curved, with a curvature of facets derived from a base lenslet designed and selected to achieve an optical function of the lenslet consistent with its use in a diffuser. The facets may be randomly placed in a pattern such that they do not have set positions within an overall pattern. This may include randomizing a center position of the facets with respect to a baseline lenslet design. The size of the facet may be selected in combination with other aspects of the diffuser to minimize undesirable diffraction effects. In some implementations, the facet height is adjusted to ease manufacturing. The parameters of the design may be chosen to keep the facet design below a diffraction limit consistent with preventing far field artifacts and achieving a reasonable roll off of a flat top diffuser function. For example, in a projective display, the lenslet size is ideally the same size or smaller than projected pixels. The boundary dimensions of the facets are limited by the diffraction limit to keep the roll off to a reasonable amount.

In one implementation, the diffuser is designed as a Flat Top Diffuser to provide an even amount of illumination per pixel to the viewer, within a pre-determined range of eye positions (eye box). An exemplary, but non-limiting, application is in a HUD, such as an automotive HUD.

The micro lens array may, for example, implement a surface relief structure. The Flat Top Diffuser has manufacturing tolerances associated with things like pitch and magnification. The faceting pattern may be implemented in individual lenslets to reduce or eliminate Moiré interference pattern artifacts.

FIG. 5D is a high-level figure showing a micro lens array having a set of lenslets, in which each lenslet has a topological curvature. The surface of the lenslet has a fractured facet pattern that, on average, follows a pre-determined base lenslet topological profile (e.g., a curved lenslet topological profile) The fractured facet pattern isn't intended to change the diffusion function of the micro lens array. However, the fractured facet pattern is designed to minimize or even eliminate Moiré interference pattern artifacts.

In some implementations, at least some aspects of the fractured facet pattern are randomized. Randomization of aspects of the local facet pattern acts to counter, or prevent, the formation of Moiré interference patterns. Randomization is done in a manner that breaks up regular arrays in a manner selected to prevent Moire image artifacts. This randomization of aspects of local facets can be done in a manner that doesn't degrade the overall diffuser function and that is also compatible with a highly manufacturable process.

Figure 6:
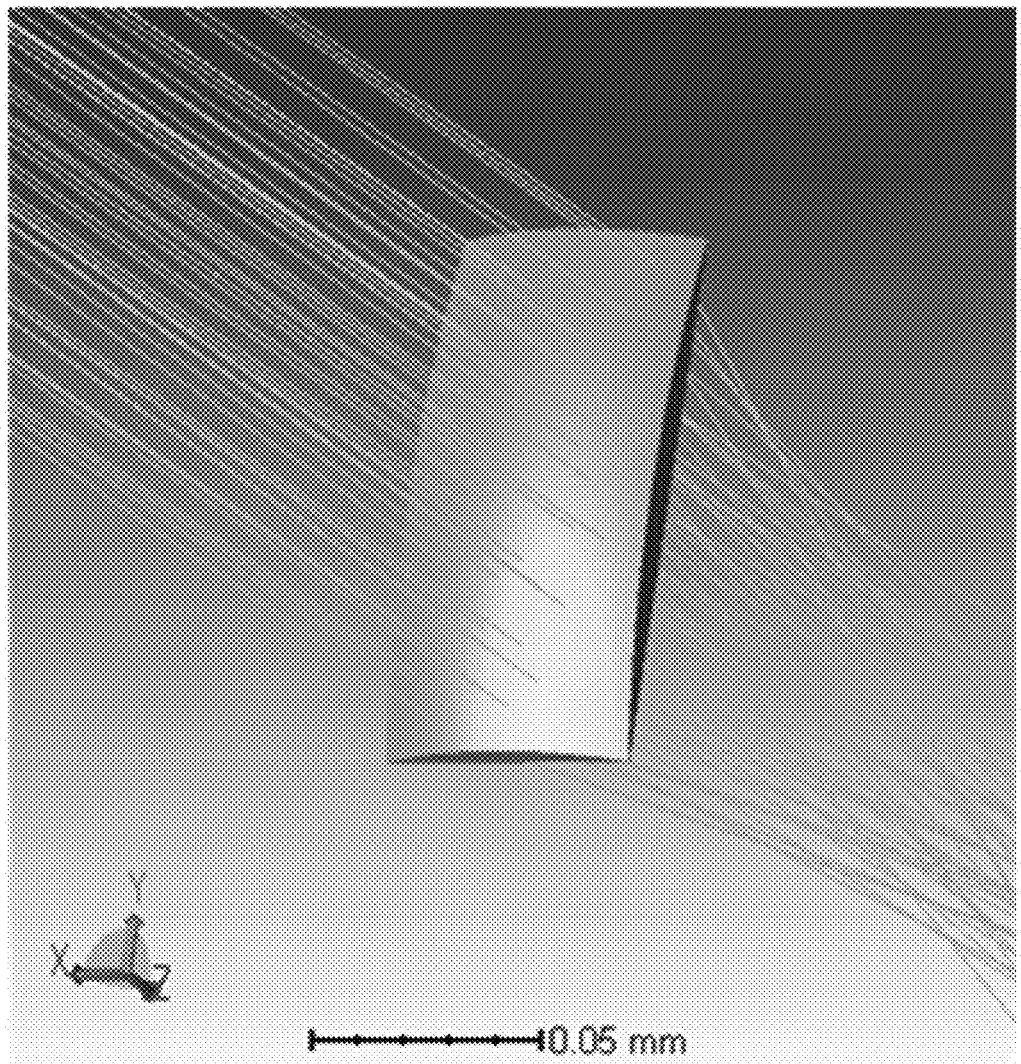
FIG. 6 illustrates a MLA lenslet in accordance with an implementation.

FIG. 6 illustrates an idealized individual lenslet with a refractive index or a mirrored reflector that has slopes to direct the light (e.g., a bidirectional light distribution function based on Snell's law) to achieve a flat top distribution, although more generally the diffuser may implement some other desirable mathematical distributions. There is thus a geometrical shape associated with an individual lenslet boundary shape (e.g., a rectangle or a square) and a surface topological profile selected to redirect light according to a light distribution function (e.g., a curved surface contour). The individual lines from the right and the left illustrate the lenslet redirecting light.

Figure 7A:
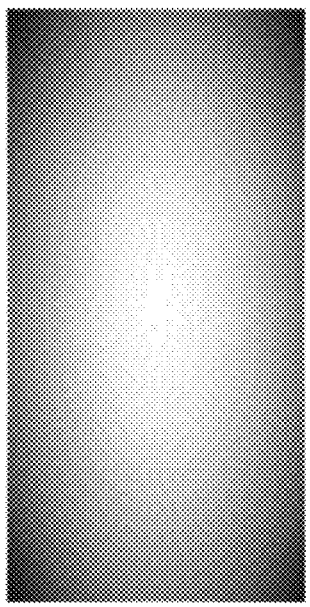
FIG. 7A illustrates a lenslet with an elliptical profile.
Figure 7B:
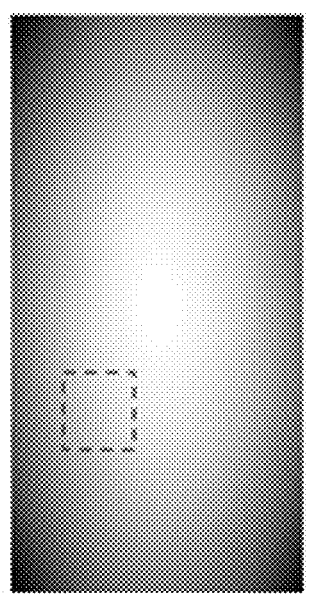
FIG. 7B illustrates a dashed box illustrating a facet.
Figure 7C:
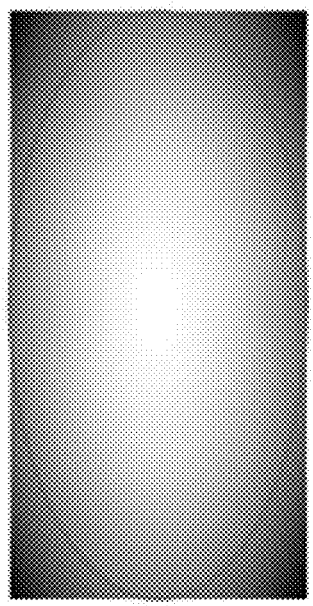
FIG. 7C illustrates the lenslet with a line showing a light distribution in accordance with an implementation.

FIG. 7A is a picture of an individual lenslet with an elliptical profile. FIG. 7B illustrates a facet region in the dotted lines. FIG. 7C shows the lenslet boundary with an additional elliptical line to describe the corresponding elliptical spread of light.

The boundary shape of the facets may be square (FIG. 7B), rectangular, circular, elliptical, hexagonal, or any continuous closed geometrical shape. The facets do not need to have an interlocking geometry.

One design rule is that facets follow the general topographical curvature (mathematically) of the base lenslet (FIG. 7A) in its local area. This rule preserves the overall diffuser function of the MLA. These facet surfaces are sections shown in blue (FIG. 7B) of a curved lenslet (FIG. 7A).

Figure 8:
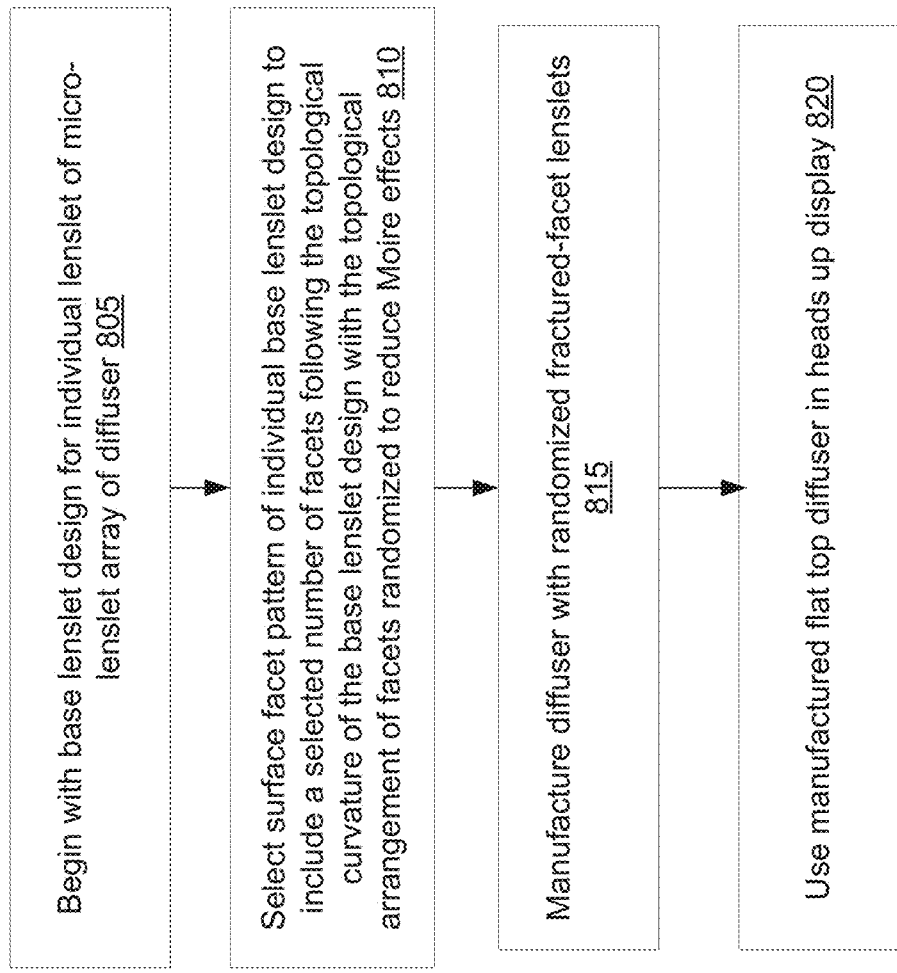
FIG. 8 is a flow chart of a method of manufacture of the diffuser in accordance with an implementation.

FIG. 8 is a flow chart of a high-level method of designing and manufacturing the lenslets of the MLA. It block 805, the process begins with a curved lenslet base-level design for an individual lenslet of a micro lens array. The base lenslet design may, for example, have a topological contour to work together with other lenslets in the MLA to implement a diffuser function, such as a flat top diffuser function. The general optical principles of designing a micro lens array to implement a diffuser function to redirect light are well known in the art.

Figure 9:
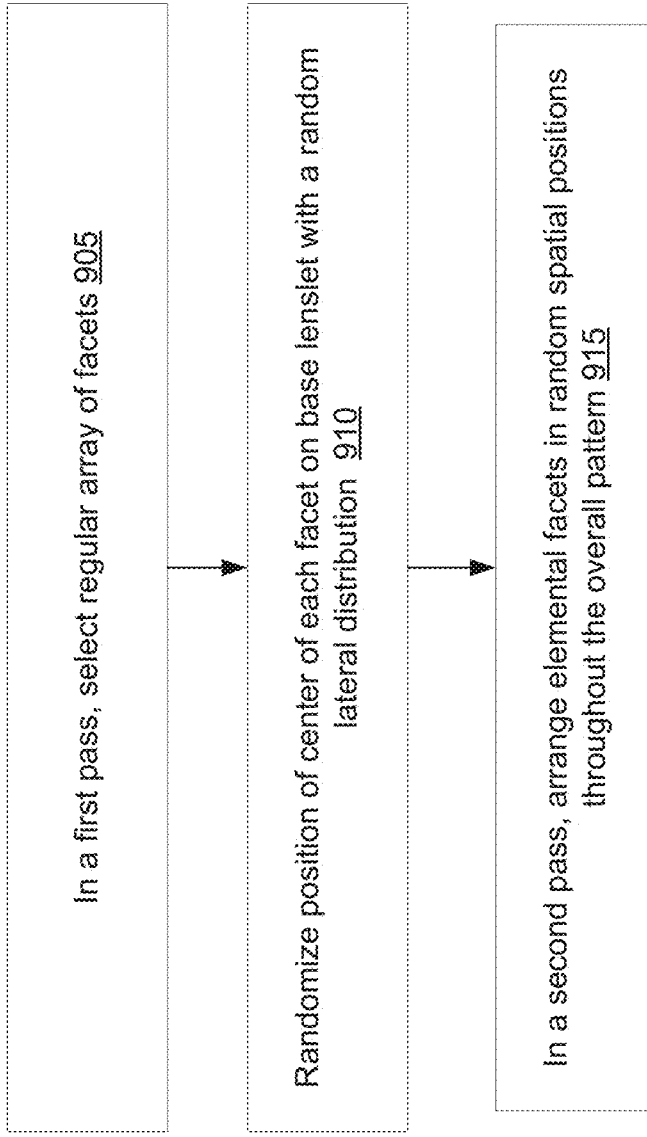
FIG. 9 illustrates a two-pass method of randomization of facet position in accordance with an implementation.

In block 810, a facet pattern is selected für the individual base-level design. This may including selecting the size of each facet, the number of facets, and other parameters. In particular, the topological arrangement of facets may include randomization of at least some aspects to reduce Moiré artifact effects. Randomization is used to break up regular arrays in order to avoid Moire image artifacts. In block 815, a diffuser, such as a flat top diffuser, is manufactured with the randomized fractured facet lenslets in the micro lens array. In block 820, the manufactured diffuser is used in a HUD, FIG. 9 is a flowchart of a high level method of randomization of the facet parameters. In block 905, in a first pass a regular array of facets is selected. In block 910, the center of each facet on the base lenslet is randomized with a random lateral distribution. This initial randomization is consistent with the overall boundary lens size and shape for the desired angular distribution of light. In block 915, a second pass arranged the elemental facets in a random spatial position throughout the overall pattern of facets.

Figure 10A:
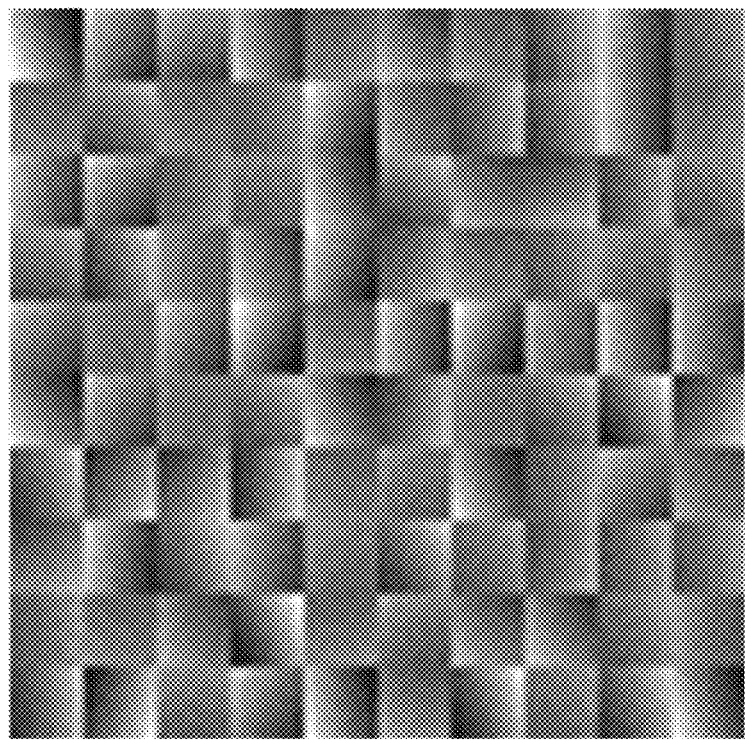
FIG. 10A illustrates an initial 10×10 facet arrangement after a first pass of randomization in accordance with an implementation.

FIG. 10A illustrates how the lenslet topographical profile is fractured into facets in a first pass. In a first pass, the facets are first laid out in a regular array. The center of each facet is selected from random positions of the base lenslet. The random position distribution from the lenslet is preferably a uniform random distribution in each lateral, x and y directions, so that it describes the boundary lens size and shape which corresponds to the desired angular distribution of light the lenslet is designed to implement.

Figure 10B:
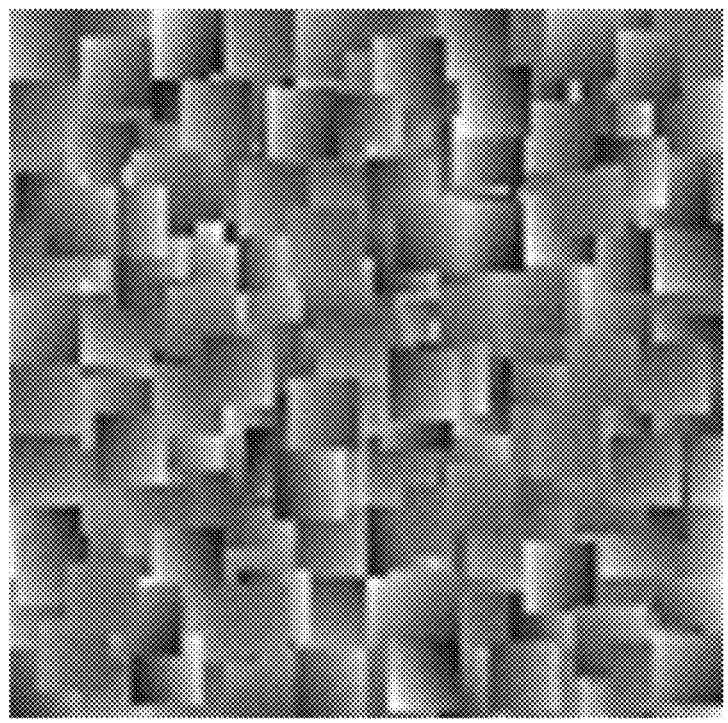
FIG. 10B illustrates the facet arrangement of FIG. 10A after a second pass of randomization in accordance with an implementation.

FIG. 10B illustrates how in a second pass, the elemental facets are arranged in a random spatial position throughout the overall pattern. In this example, new facets overwrite whatever pattern was there previously. The positions are unrelated to the size of the lenslets or facets.

A variety of rules may be used to aid in manufacturing and minimizing undesirable diffraction effects. An example of a set of rules is now described.

In one implementation, the lower facet size limit is restricted to: 1) the resolution of the tooling imager; and 2) the diffraction spread angle tolerable for a particular HUD.

In one implementation, the height of each facet is shifted:
1) When the facet is originally calculated, the position corresponding to the height of the lenslet surface;
2) The median or mean of the facet height is found;
3) The median or mean position is moved to a common plane; and
4) This is done to minimize the height of the overall pattern, which makes manufacturing less resource intensive. The purpose of step 4) is to avoid missing patterned areas.

As illustrated in FIG. 10B, after the second pass, a multitude of facets are placed inside the pattern in randomized positions. The main purpose of this second pass is to break up any regular arrays and thus avoid Moiré image artifacts.

A secondary reason for the randomization is to avoid any alignment requirements between 2 sets of arrays. This approach means that:
1) Only the projected pixels have a regular array;
2) The diffuser pattern has no regular array;
3) No alignment is required in x and y position; and
4) The rotation has to still match within reason for the eyebox.

Even this is not critical if circles are chosen for facet shape boundary.

These are examples of some rules that can be used. They are not an exclusive list of rules. The most important aspect of these examples is that partially or completely randomized position of facets can be used to break up the types of regularities that generate Moiré interference artifacts.

It should be noted that the randomization does not have to be perfect in a mathematical sense. An algorithm using a pseudorandom number generator and a few rules may be used to create significant variations in the position of facets that approximates randomization in regards to the effect on light.

Additional Considerations for HUD Applications

Some additional design considerations will now be discussed. Flat Top Diffusers for HUD display applications using digital light projectors (DLPs) require specific conditions for successful display applications.

When the illumination source is LCD or fixed arrays, the diffuser's lens pitch and position must match the display grid (example pitch sizes are 40 microns to 100 microns). This matching can be accomplished with an integer size of the display pitch with respect to the diffuser lens array, where:
Pixel size=N×Lens size, and where N is an integer 1 or larger.

This can be accomplished with a regular MLA for the diffuser.

However, when a grid of pixels is projected into space with lenses in between the optics are quite different, and becomes impossible to get an exact match in production. This is due to the following reasons:
1) Lenses possessing tolerance differences which produces magnification differences and thus Moiré problems between the image and diffuser; and
2) Distortion of the image produced by the imaging lens, which also deviates the position of the pixels with the diffuser lens array;

To solve these issues, the lenslet (one lens in a regular micro lens array) is fractured into smaller elemental facets.

The facets (which as an example may be 5 microns to 20 microns) must be smaller than the single lenslet. The following 5 considerations are relevant:
1) The function of a single lens is to distribute the light using refractive (Snell's law) theory of light to distribute the light into angular space.
2) Ideally, the single lens must have a size such that its rms depth is at minimum:

Depth$>=\lambda/(n-1)$

This is to avoid the diffraction effects becoming the dominant physical factor, where the ray tracing calculations are no longer predictive;
3) The other size consideration is the lenslet should be no bigger than one projected pixel. This is so that the statistical fill of the diffuser angle is satisfied within the area of a pixel. If the lenslets were smaller than 1 pixel, it would help the statistical fill;
4) The facet diameter size (D) must also avoid the diffraction limit. For circular facets, we have for the angular spread: angular spread<$1.22\lambda/D$. For rectangular facets, we have for the angular spread: angular spread<$1.0\lambda/D$. The rate of angular spread must be kept under the spread of the desired Diffuser angle or the Flat Top distribution will no longer hold. The angular spread will also be seen as an edge roll-off and will reduce the light efficiency inside the desired eyebox; and
5) Statistically the ideal facet area should be 1 percent or less than the area of a projected pixel.

As previously discussed, arrangement of the facets cannot be a regular array if the facet patterns is to reduce or eliminate Moiré interference artifacts. Aspects of randomization need to be included. A random spatial location is preferably assigned to each facet element in order to avoid Moiré interference artifacts.

Figure 11A:
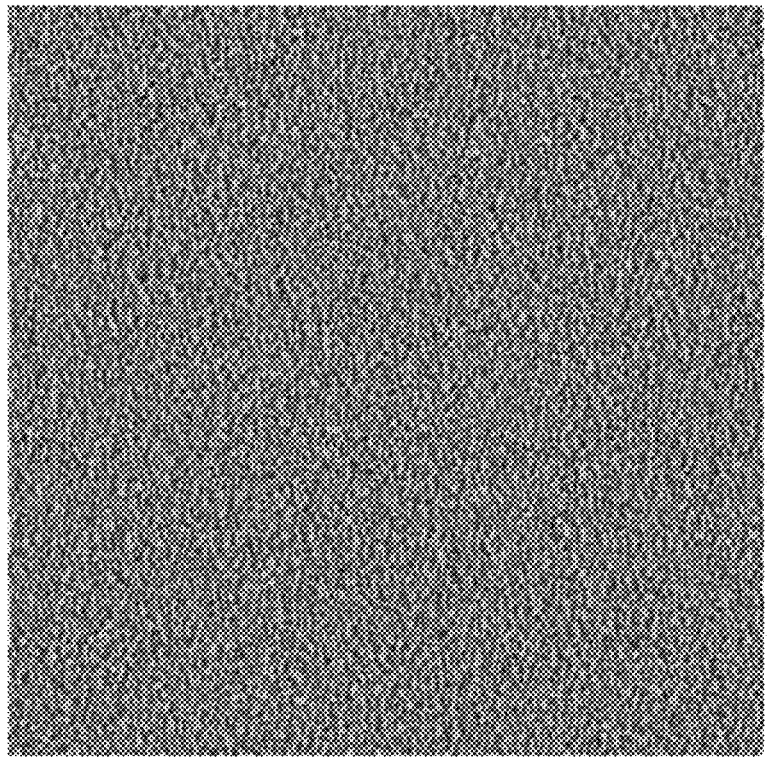
FIGS. 11A and 11B are examples of diffuser patterns in accordance with an implementation.
Figure 11B:
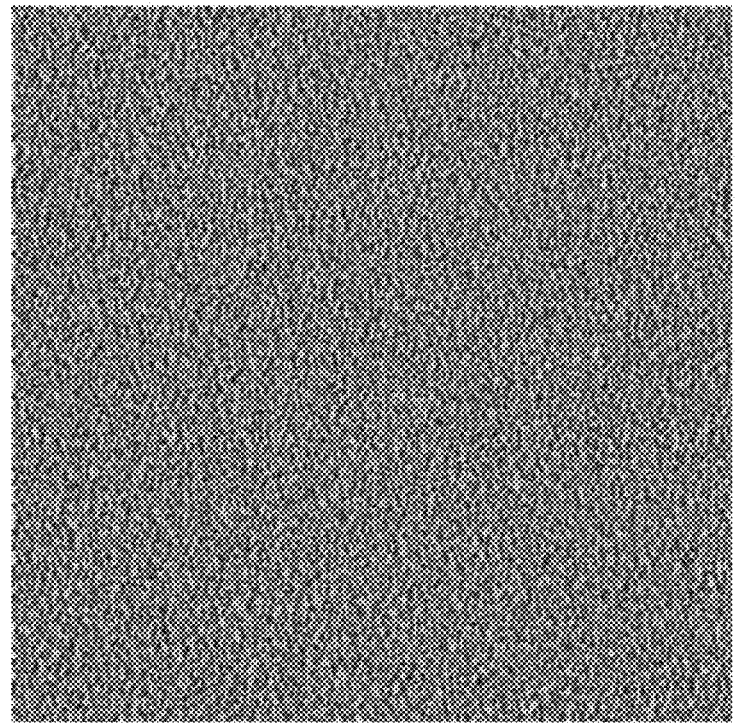
Figure 12A:
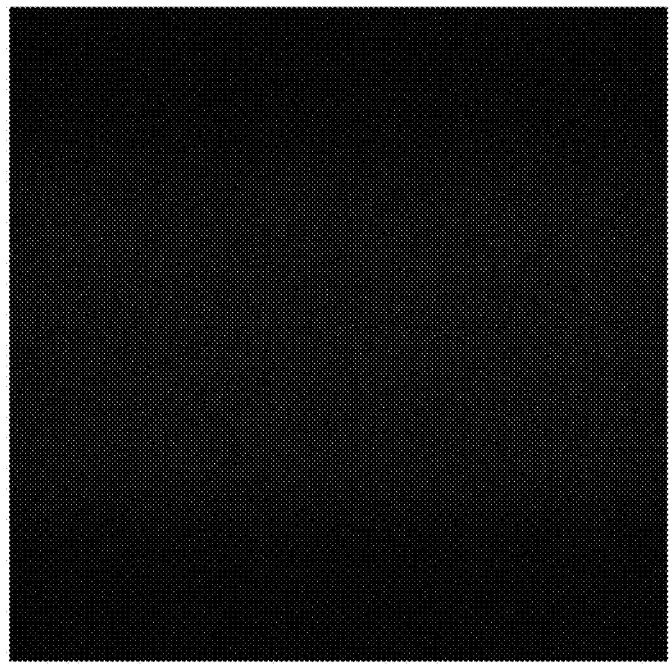
FIG. 12A illustrates coherent light effects and FIG. 12B illustrates incoherent light effects in accordance with an implementation.
Figure 12B:
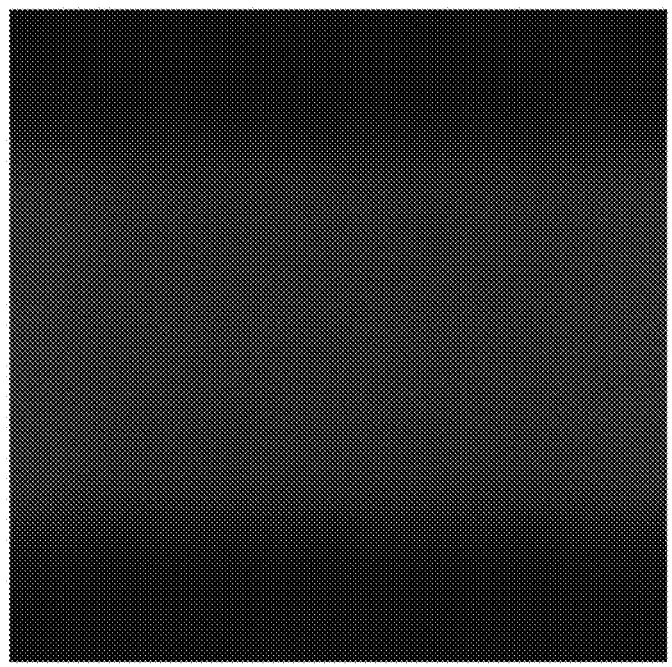

A diffractive analysis may be applied to prevent undesirable diffractive effects. The diffuser should be designed to operate in the refractive regime. However, a diffractive analysis is necessary to detect any undesirable diffractive effects with complex patterns such as this anti-Moiré diffuser pattern (FIGS. 11A & 11B). Starting with the type of anti-Moiré FTD pattern described above, the diffraction is computed and shows results with coherent (FIG. 12A light effects and incoherent (FIG. 12B) light effects. Some amount of zero order (coherent FIG. 12A) or specular component (incoherent FIG. 12B) is demonstrated, but is well within tolerable amounts.

The overall pattern can be designed to repeat regions (rectangular in shape) so that abutting regions will look seamless (unnoticeable) to the system. This is mainly for computational efficiency and size of overall part. It will not be necessary once computational memory capacity matches or exceeds physical pattern size of the part.

Case Study Example

A detailed example is now described of designing a flat top diffuser anti-Moiré structure in a flat top diffuser. As an example, an illustrative goal of the flat top diffuser is a 30×15 degrees full width half maximum flat top diffuser with a rectangular boundary. In this example, an illustrative customer imaging pixel pitch is 100×100 microns. The longest wavelength for Red LED light sources used in head up displays (HUD) are typically 650 nm.

Figure 13:
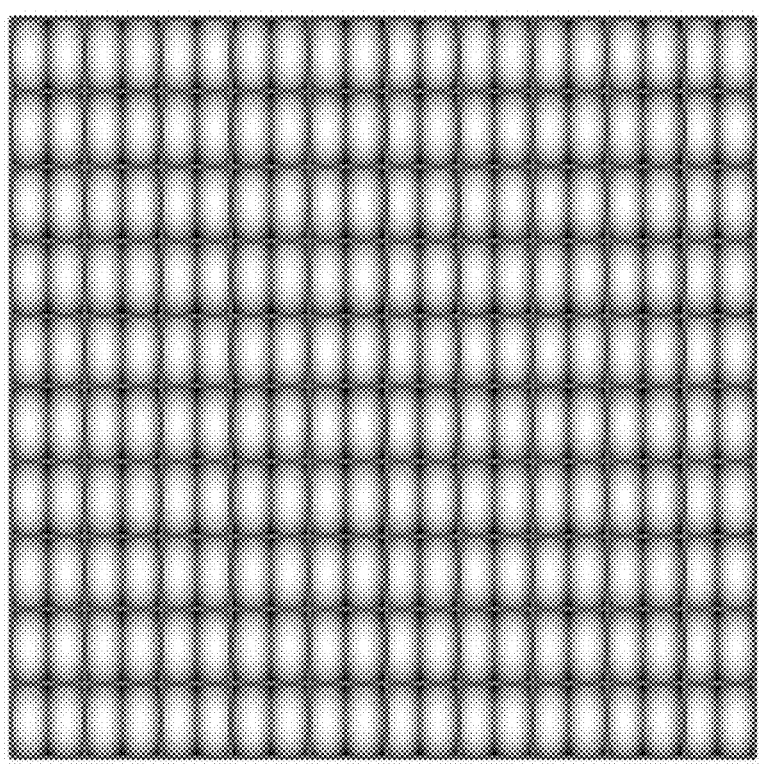
FIG. 13 illustrates an example of a micro lens array in accordance with an implementation.

The fractured lenslet facet size is 10×10 microns. Minimum lateral size of a lens to avoid unwanted diffraction effects is 40×80 microns. This is when the root mean square (RMS) of the lens sag (depth) exceeds $\lambda/(n-1)$. The 40 micron size would spread the light in the 30 degrees direction. The 80 microns size would spread the light in the 15 degrees direction. For our case, since the Grid pixel is 100×100 microns, we can choose 50×100 microns for the lenslet size in a MLA, such as that of FIG. 13. FIG. 13 illustrates a MLA with lenslets illustrated in gray and blue lines representing imaging pixel boundaries.

Consider now a diffraction spread calculation:

Let $S=1.0\lambda$ F/D, where $\lambda$ is the wavelength of light, S is the spot size from peak to first dark band (rectangular aperture) and in most optical literature, a circular aperture is assumed in which case $S=1.22\lambda$ F/D, F=is the focal length, and D=is the diameter.

Figure 14:
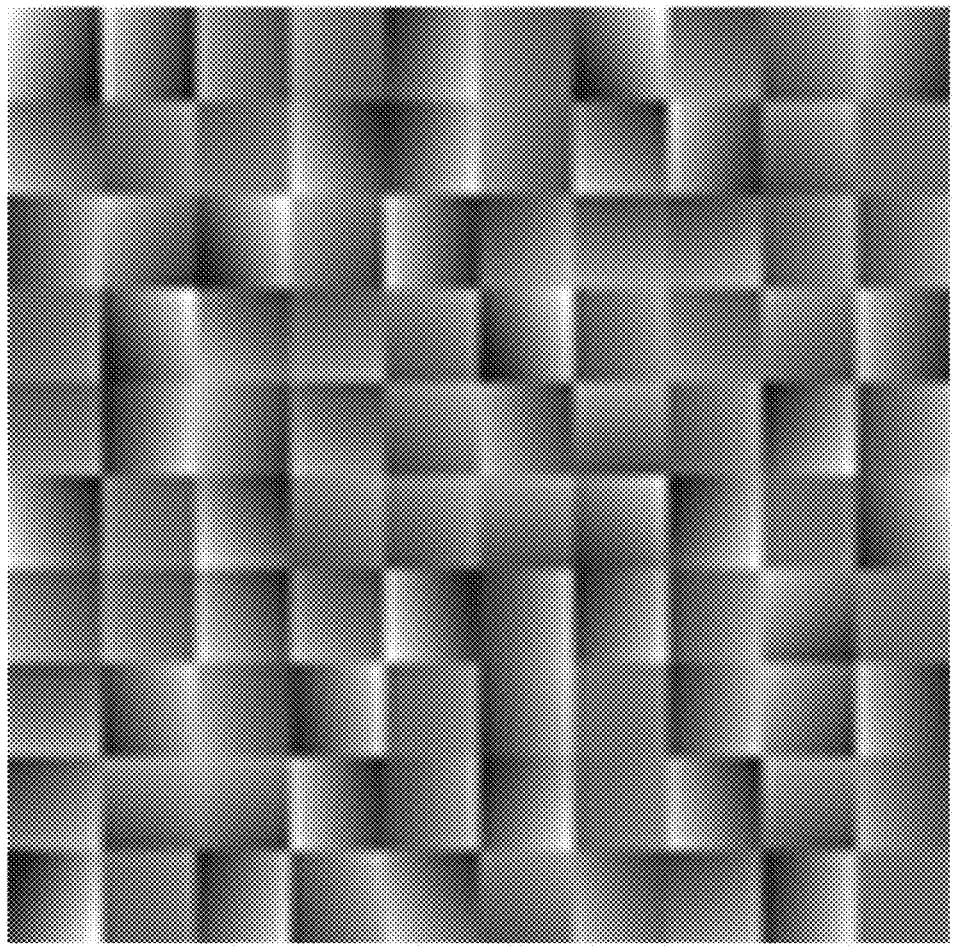
FIG. 14 illustrates an initial step of facet patterning and FIG. 15 illustrates a second step of facet patterning in accordance with an implementation.
Figure 15:
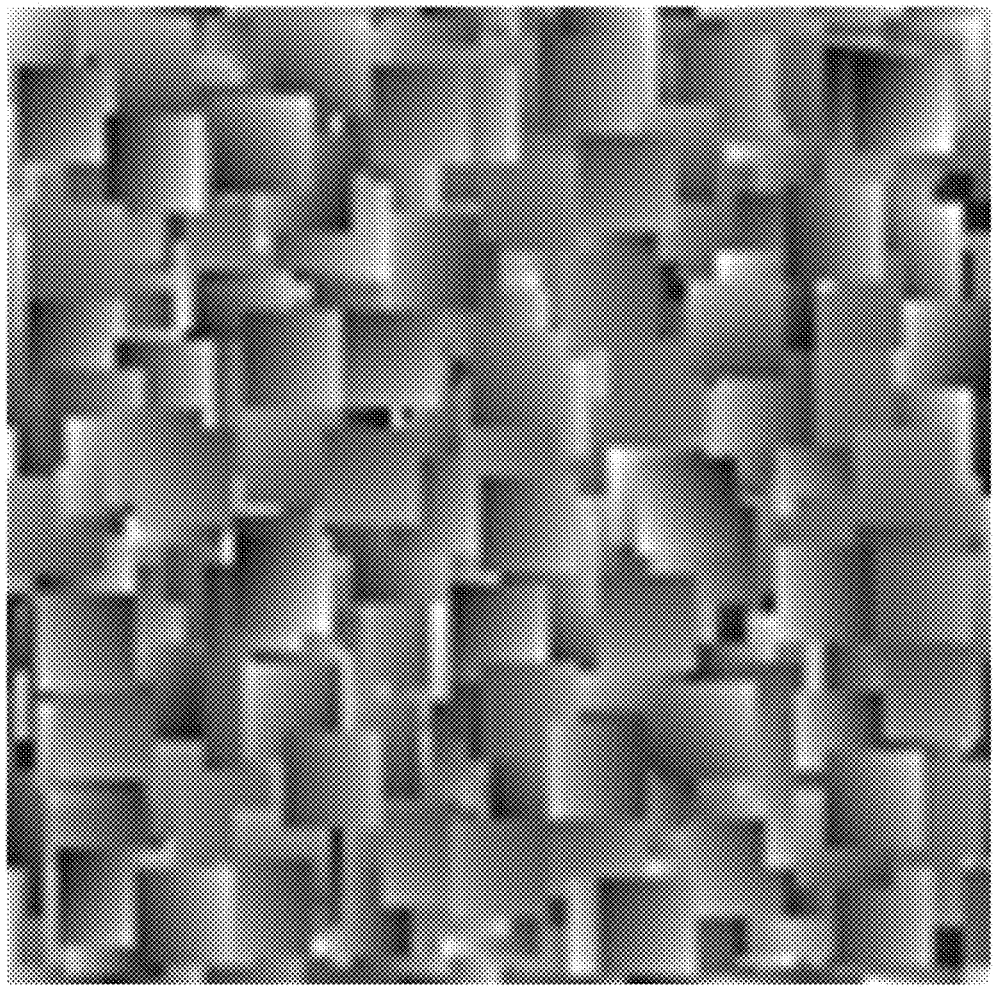

Converting the equation into angular space, we have:
1. Angle=S/F=$1.0\lambda/D$ (radians)
2. Angle W=30 degrees for full width half maximum (FWHM) of the diffuser
3. Angle w is the diffracted angle in the width direction
4. Angle w=0.65/50=0.013 rad=0.745 deg diffracted angle
5. Angle H=15 degrees for FWHM of the diffuser
6. Angle h is the diffracted angle in the height direction
7. Angle h=0.65/100=0.0065 rad=0.372 deg diffracted angle FIG. 14 illustrates 10×10 facets in an MLA pattern. FIG. 15 illustrates a single pixel with scaled 10×10 facets in a randomly placed lenslet (RPL) pattern.

The above equations show that, for a micro lens array of facets (14), the diffraction effects are small compared to the angle of interest at 2.5%.

To see the true effects of noise, we will examine the diffraction effects of the pattern, instead of the facet.

To describe the pattern type, we will designate Micro Facet Array (MFA), Randomly Placed Facets (RPF)n and Partial RPF (PRPF).

Figure 16A:
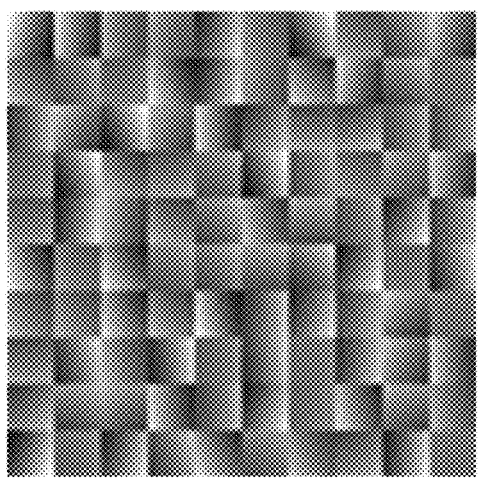
FIG. 16A illustrates an example of a facet pattern.
Figure 16B:
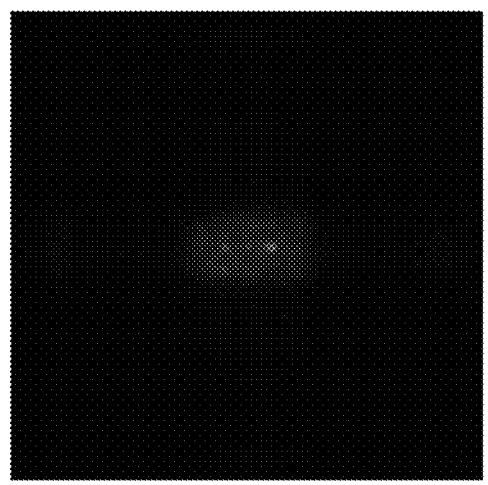
FIGS. 16B, 16C, and 16D illustrate the far field plot and slice plots in accordance with an implementation.
Figure 16C:
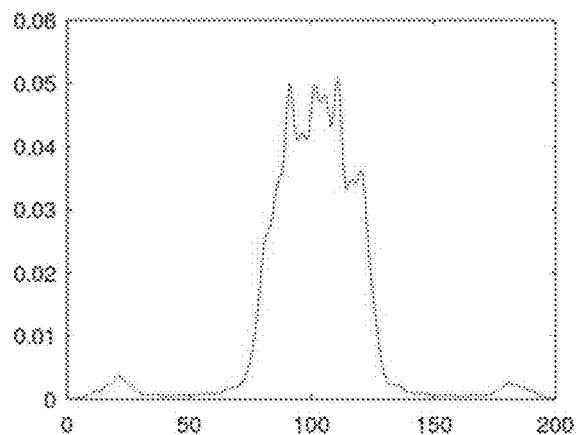
Figure 16D:
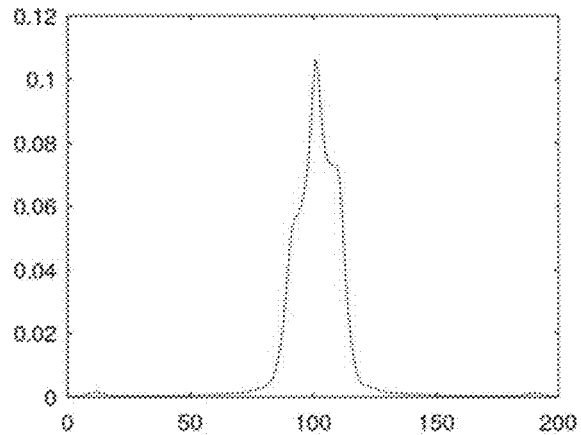

FIGS. 16A, 16B, 16C, and 16D illustrate MFA single pixel and corresponding far field pattern and slice plots. FIG. 16A illustrates a MFA. FIG. 16B illustrates a far field pattern and FIGS. 16C and 16D are slide plots along two different axes.

FIGS. 17A, 17B, 17C, and 17D illustrate a MFA+PRPF, single pixel, and corresponding far field pattern, and slice plots. FIG. 17A illustrates a MFA+PRPF. FIG. 17B illustrates a far field pattern and FIGS. 17C and 17D are slide plots along two different axes.

Figure 18A:
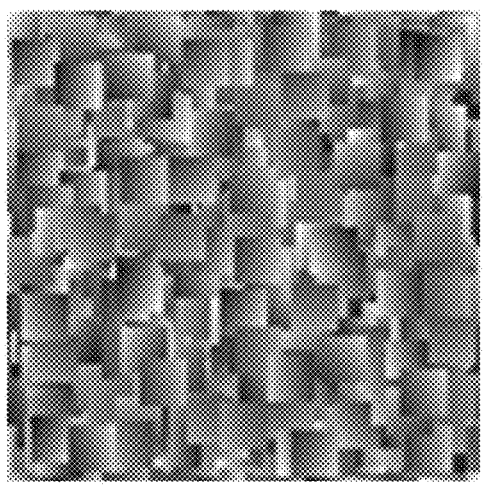
FIG. 18A illustrates an example facet pattern and FIGS. 18B, 18C, and 18D illustrate the far field plot and slice plots in accordance with an implementation.
Figure 18B:
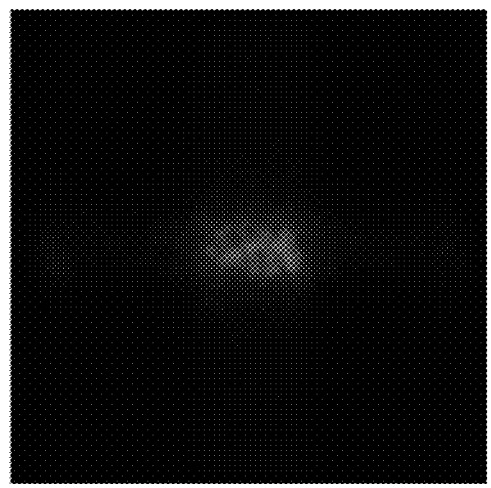
Figure 18C:
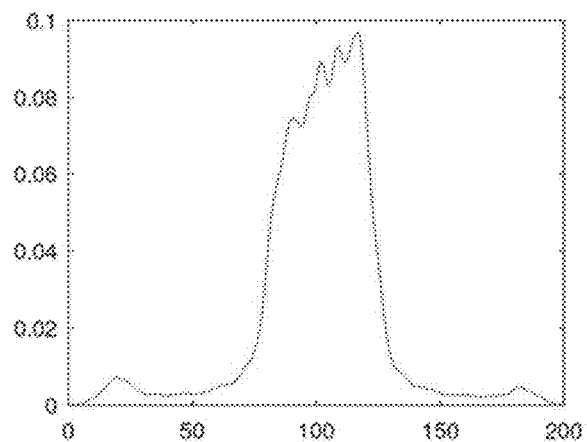
Figure 18D:
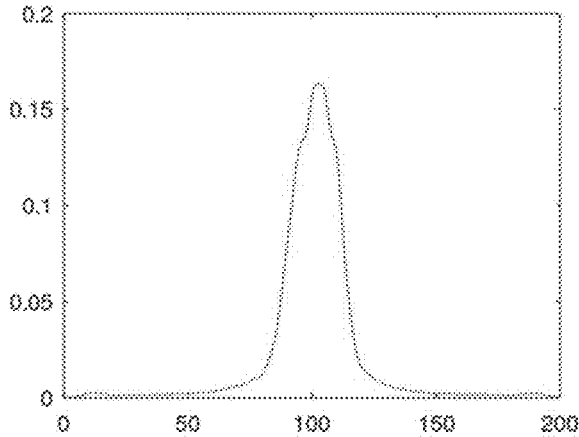

FIGS. 18A, 18B, 18C, and 18D illustrate a RPF single pixel, and corresponding far field pattern and slice plots. FIG. 18A illustrates a RPF. FIG. 18B illustrates a far field pattern and FIGS. 18C and 18D are slide plots along two different axes.

Calculating the energy outside of the FWHM for each case. For MLA we get 0.8345×0.8114=0.6771 inside the FWHM. For MLA+PRPL we get 0.8091×0.7715=0.6242 inside FWHM. For RPL we get 0.7908×0.7288=0.5763 inside FWHM. More energy is lost to the outside (FWHM) with the random placement of facets. However, the trade-off is better anti-Moiré, since there are less (or no) structured boundary lines. There seems to be a better randomized uniformity also.

The results provide empirical data about some of the benefits of using micro facets and partially or complete randomizing their positions.

Alternate Diffuser Design Examples

The diffuser design may more broadly be thought of as an array of micro optical elements (e.g., a micro lens array or a micro reflector array) in which each micro optical element has micro-facets that follow a topological contour designed to achieve the overall diffuser function. In this broad concept, the diffuser function can be arbitrary in the most general case. In the most general case, the micro-facets on each individual micro-optical element can be implemented using any arrangement that at least partially reduces Moiré interference artifacts. In some use cases, an array of micro-facets may be sufficient. In other cases at least partial randomization of an aspect of the micro-facet placement is provided.

Regular Facet Array Example

Many variations of the lenslets are contemplated. In some implementations, the facets are arranged in a regular array. That is, in some use cases forming a regular array of facets on a lenslet may reduce Moiré interference artifacts enough for some end-use applications.

Mirrored Diffuser Array Example

As previously discussed, in an alternative implementation, an array of mirrored reflectors is used. In this implementation, each individual mirror reflector may be fractured into facets. As with other examples, the overall shape of each individual mirror reflector follows a topographical profile for the array of mirrored reflectors to implement the desired diffuser function. The fracturing of the surface of individual mirrored reflectors into facets is selected to reduce Moiré interference artifacts. An element of randomization of the placement of the facets may further be used to reduce Moiré interference artifacts.

Asymmetric Flat Top Diffuser Example

While the diffuser may be designed to implement a symmetric flat-top diffusion function, more generally the diffuser may be designed to implement an asymmetric flat top diffusion function. For example, the boundary condition for the facet location of a base lens may lean towards one side of the optical axis, which in turn will shift the mean of the bidirectional scatter distribution function (BSDF).

Gaussian Diffuser Example

The diffuser may be designed as a flat top diffuser but more generally have other optical distributions, including a Gaussian distribution.

Arbitrary Intensity Shape Diffuser Example

While the diffuser may be designed to implement a flat top or gaussian distribution, more generally the diffuser may have an intensity shape designed for a particular end-use application. Within the limits of optical physics, the diffuser intensity shape may be arbitrary in the sense of being designed for a particular end-use application.

Complete Heads Up Display System

It will be understood in the above examples that the optical diffuser may be utilized in a Heads Up Display (HUD) system having a digital light projector and a computing device to generate image data for the digital light projector. The HUD system may also further include other optical components known in the HUD art. The HUD system may also include in some implementations an additional screen surface onto which light from the optical diffuser is directed.

OTHER ALTERNATE EMBODIMENTS AND VARIATIONS

In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware.

Reference in the specification to "one embodiment", "some embodiments" or "an embodiment" means that a particular feature, structure, or characteristic described in connection with the embodiment is included in at least some embodiments of the disclosed technologies. The appearances of the phrase "in some embodiments" in various places in the specification are not necessarily all referring to the same embodiment.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms, for example, "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The disclosed technologies may also relate to an apparatus for performing the operations herein. This apparatus may be specially constructed for the required purposes, or it may include a general-purpose computer selectively activated or reconfigured by a computer program stored in the computer.

The disclosed technologies can take the form of an entirely hardware implementation, an entirely software implementation or an implementation containing both software and hardware elements. In some implementations, the technology is implemented in software, which includes, but is not limited to, firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and, other aspects are not mandatory or significant, and the mechanisms that implement the present techniques and technologies or its features may have different names, divisions and/or formats

What is claimed is:

1. An optical diffuser for a Heads Up Display (HUD), comprising:
    a micro lens array having an array of lenslets shaped to implement an optical diffuser function;
        each individual lenslet having micro facets following a topological contour of a curved base lenslet shape for the individual lenslet with a placement of the micro facets selected to prevent Moiré interference artifacts in response to the micro lens array being illuminated by a digital light projector.

2. The optical diffuser of claim 1, wherein the placement of the micro facets is at least partially randomized.

3. The optical diffuser of claim 2, wherein each micro facet is selected to have a random position on a base lenslet.

4. The optical diffuser of claim 2, wherein the micro facets further have a random spatial position within an overall pattern.

5. The optical diffuser of claim 1, wherein the array of lenslets is shaped to implement one of: a flat top diffuser function, an asymmetric flat top diffuser function, and a gaussian diffuser function.

6. The optical diffuser of claim 1, wherein the micro facets are randomly placed on the surface of the lenslet.

7. The optical diffuser of claim 1, wherein a lenslet size is less than a size of one projected pixel.

8. The optical diffuser of claim 1, wherein a micro facet size is selected such that its diffraction limit angle is smaller than a diffuser angle.

9. The optical diffuser of claim 1, wherein each micro facet has a size less than 1% of a projected pixel size.

10. A Heads Up Display (HUD), comprising:
    a micro lens array having an array of mirrored lenslets to implement an optical diffuser, with each individual lenslet having micro facets following a topological contour of a curved base lenslet shape where the micro facets are placed in randomized positions on the curved base lenslet shape to prevent Moiré interference artifacts in response to the micro lens array being illuminated by a digital light projector.

11. The HUD of claim 10, wherein each micro facet is selected to have a random position on the curved base lenslet.

12. The HUD of claim 11, wherein the micro facets further have a random spatial position within an overall pattern.

13. The HUD of claim 10, wherein the micro facets are curved, with the curvature of the micro facets with a curvature derived from optical function lenslet.

14. The HUD of claim 10, wherein a lenslet size is less than a size of one projected pixel.

15. The HUD of claim 10, wherein a micro facet size is selected such that its diffraction limit angle is smaller than a diffuser angle.

16. The HUD of claim 10, wherein a micro facet size is less than 1% of a projected pixel size.

17. The HUD of claim 10, wherein the array of lenslets is shaped to implement one of: a flat top diffuser function, an asymmetric flat top diffuser function, and a gaussian diffuser function.

18. An optical diffuser for a Heads Up Display (HUD), comprising:
    a micro lens array having an array of lenslets to implement a flat top diffuser, with each individual lenslet having micro facets following a topological contour of a curved base lenslet shape with the micro facets placed in randomized positions on the curved base lenslet shape to prevent Moiré interference artifacts in response to the micro lens array being illuminated by a digital light projector, wherein the micro facets are curved, with the curvature of the micro facets being derived from an optical function of the lenslet, a micro facet size is below a diffraction limit size, and a micro facet size is less than 1% of a projected pixel size.

19. A method of operating a heads up display, comprising:
    providing a digital light projector;
    providing a micro lens array having an array of lenslets to implement an optical diffuser, with each individual lenslet having micro facets following a topological contour of a curved base lenslet shape with the micro facets placed in randomized positions on the base lenslet shape to prevent Moiré interference artifacts in response to the micro lens array being illuminated by a digital light projector, wherein the micro facets are curved, with the curvature of the micro facets being derived from an optical function of the lenslet, a micro facet size is below a diffraction limit size, and a micro facet size is less than 1% of a projected pixel size; and operating the digital light projector to generate a heads up display without Moiré interference artifacts.

20. The HUD of claim 19, wherein the array of lenslets is shaped to implement one of: a flat top diffuser function, an asymmetric flat top diffuser function, and a gaussian diffuser function.

\* \* \* \* \*